F. A. STEVENSON.
MACHINE FOR PUNCHING ARMOR PLATE.
APPLICATION FILED MAR. 12, 1918.

1,318,023.

Patented Oct. 7, 1919.
7 SHEETS—SHEET 1.

INVENTOR:
FREDERICK A. STEVENSON
BY T. H. Gibbs
ATTORNEY.

F. A. STEVENSON.
MACHINE FOR PUNCHING ARMOR PLATE.
APPLICATION FILED MAR. 12, 1918.

1,318,023.

Patented Oct. 7, 1919.
7 SHEETS—SHEET 6.

INVENTOR:
FREDERICK A. STEVENSON
BY J. H. Gibbs
ATTORNEY

F. A. STEVENSON.
MACHINE FOR PUNCHING ARMOR PLATE.
APPLICATION FILED MAR. 12, 1918.

1,318,023.

Patented Oct. 7, 1919.
7 SHEETS—SHEET 7.

INVENTOR:
FREDERICK A. STEVENSON
BY F. H. Gibbs
ATTORNEY.

UNITED STATES PATENT OFFICE.

FREDERICK A. STEVENSON, OF DETROIT, MICHIGAN, ASSIGNOR TO AMERICAN CAR AND FOUNDRY COMPANY, OF ST. LOUIS, MISSOURI, A CORPORATION OF NEW JERSEY.

MACHINE FOR PUNCHING ARMOR-PLATE.

1,318,023.            Specification of Letters Patent.            Patented Oct. 7, 1919.

Application filed March 12, 1918. Serial No. 221,951.

*To all whom it may concern:*

Be it known that I, FREDERICK A. STEVENSON, residing at Detroit, county of Wayne, State of Michigan, and being a citizen of the United States, have invented certain new and useful Improvements in Machines for Punching Armor-Plate, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Fig. 15 is a fragmentary plan view illustrating a fragment of the bed and one of the arms of same, also of the conveying chain, lugs for conveying a sheet to be operated upon, and a stop hereinafter referred to;

This invention relates to new and useful improvements in apparatus for punching armor plate and other frangible metals in sheet form and comprises certain features of novelty as hereinafter more specifically set forth.

In the drawings is illustrated an apparatus by means of which the process is carried out and which apparatus, in certain general features and in details of construction, represents one feature of the invention.

For purposes of illustration, the drawings show as one feature an ordinary punching press which is equipped with a stripper mechanism somewhat akin to that illustrated in my Patent No. 1,149,226 of August 10, 1915, which stripper mechanism coöperates with gang punches suitably mounted in a movable head 1 above a stationary bed 2, which head carries with it a multitude of punches 3 which, in the present instance, are combined in banks or clusters held in suitable punch-retaining sockets 4 suitably secured to the movable head 1 and said punches register with dies 5 held by the stationary bed plate 2, which latter supports the sheets 6, of armor plate or similar metal, to be punched.

It is well known that armor plate steel is so frangible that it is practically impossible to punch it while it is cold and varous means have been tried to permit punching armor plates with but limited success, in consequence of which sheet metal of an analysis corresponding to armor plate has not been used as extensively as it might have been, or as extensively as may have been desirable, because of the difficulty of working it, including the projection of suitable orifices through it by means of which it could be connected with other members.

The sheet to be punched by the process hereinafter more fully described is relatively thin, that is, it is only a fraction of an inch in thickness, but for the purposes intended such sheets must be provided with a large number of orifices for rivets, etc., to connect the sheet with other structural members and while it is possible to drill each hole separately and also a number of holes at the same time, such drilling process is necessarily slow and retards quantity production which, at this time, is essential to economy in manufacture.

Electric current has been employed for heating isolated spots or zones, one at a time, in the surface of a sheet of armor plate, but it is unimportant whether such process would or would not be successful in practice, as it would necessarily be slow and could not advantageously be used in punching the many thousands of sheets required. This is due in part to the more or less cumbersome apparatus which would be required and also to the fact that, as in the present instance, it is necessary to secure rapidity of operation without the renewal of parts and punch, within a restricted area, a plurality and sometimes a relatively large number of holes.

Experiments have demonstrated that where only a small area is heated in a large mass of metal, a slow and relatively difficult process of annealing should be employed or, almost instantly after the withdrawal of the sheet of metal from the heating medium, the great mass of cold metal surrounding the heated spot will quickly cool such heated spot and the temper of that spot will be substantially as it was prior to the heating. This has led to the suggestion of punching while the metal is subjected to a heating electrical current which in any apparatus at present known would materially restrict the output where a large number of perforations are required.

To overcome difficulties inherent in earlier processes and apparatus, the present invention contemplates the simultaneous heating of a number of restricted and isolated spots or zones, each and all of considerably less area than the area of the cold sheet or metal to be operated upon, and thereupon immediately punching preferably clusters of holes in said sheet at predetermined points therein within such isolated heated zones, all the clusters of holes being isolated from each other before the absence of heat in the mass of metal surrounding such isolated and heated zones will have an opportunity to cool the heated portions.

In practising the process, I employ the punching machine 10 with means for reciprocating the movable head 1 somewhat similar to that illustrated and described in Patent No. 812,576 of Feb. 13, 1906, by means of which the cam shaft 11, eccentric 12 and pitman 13 cause the movable head 1 to rise and fall through suitable connecting means not at all important for the present invention, as any punching press employing a vertically reciprocatory head adapted to carry a number of punches, as shown, would answer the purpose. Connected, however, to a frame member 14 of the punching machine is a transversely extending arm 15 with which are loosely connected links 16 by means of bolts serving as bearing pins 17 projected through elongated slots 18 of said links 16 so as to permit a relatively loose connection between the links 16 and arm 15 for the purposes hereinafter set forth.

Figure 1:
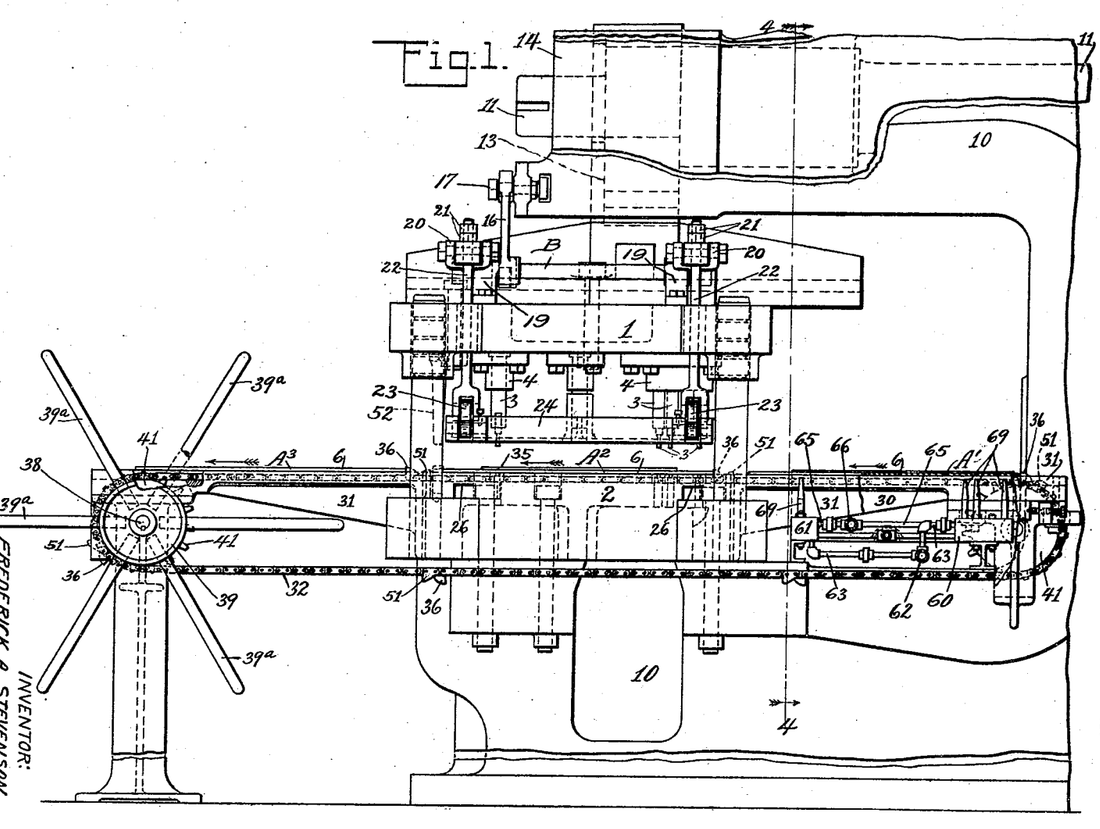
Figure 1 is a side elevational view of my improved apparatus positioned within the frame of a commercial punching machine.
Figures 3, 13, 14:
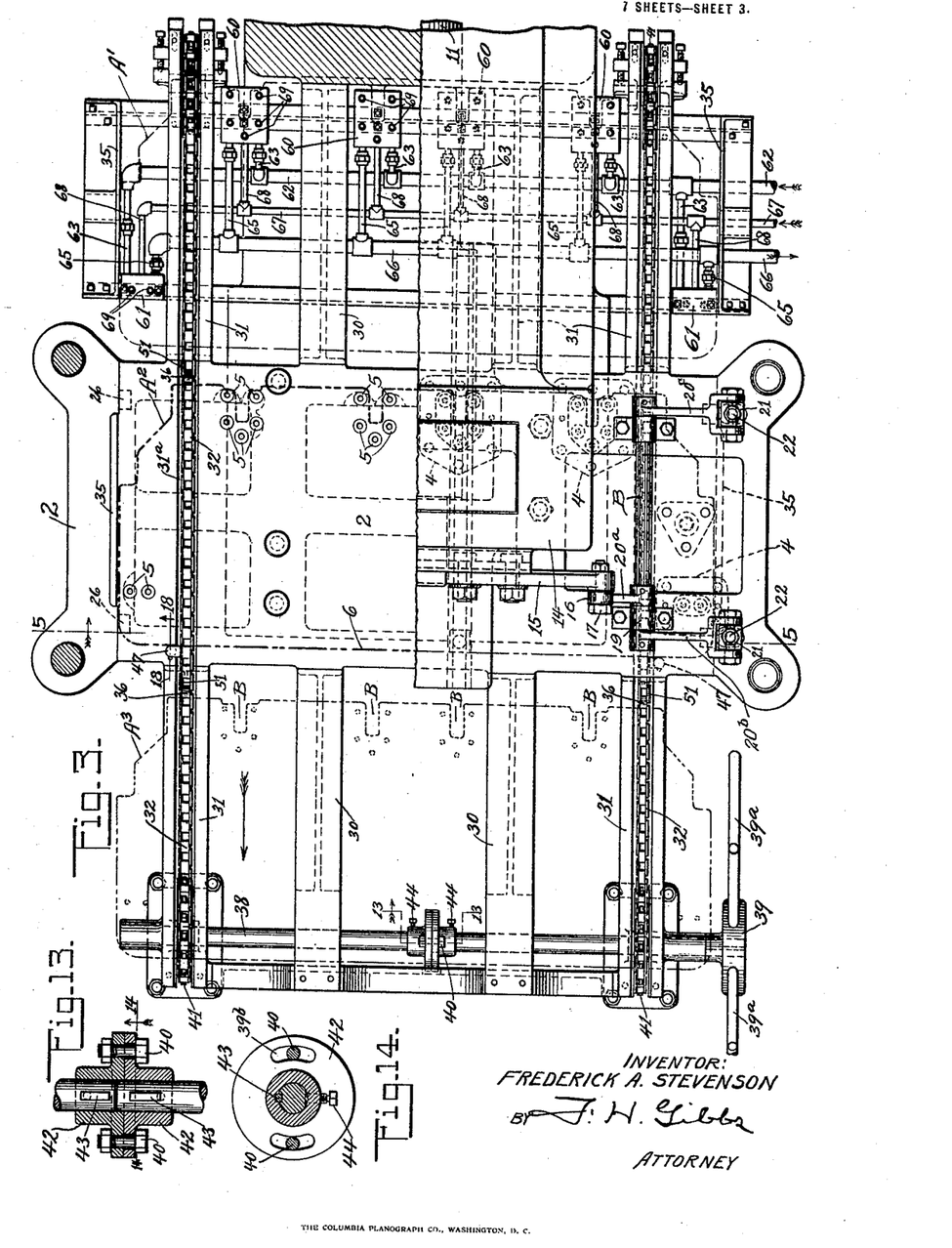
Fig. 3 is a sectional view, being taken substantially on the line 3—3 of Fig. 2.
Figs. 13 and 14 are fragmentary sectional views through the shaft coupling hereinafter referred to, being taken on line 13—13 of Fig. 3.

Supported near each end of the movable head 1 are bearings 19, and, as shown in Figs. 1 and 3, they are spaced from each other. Rotatably mounted in each pair of the bearings 19 are the shafts A and B. These shafts are preferably so mounted in the bearings that their ends project outwardly therefrom.

Figure 2:
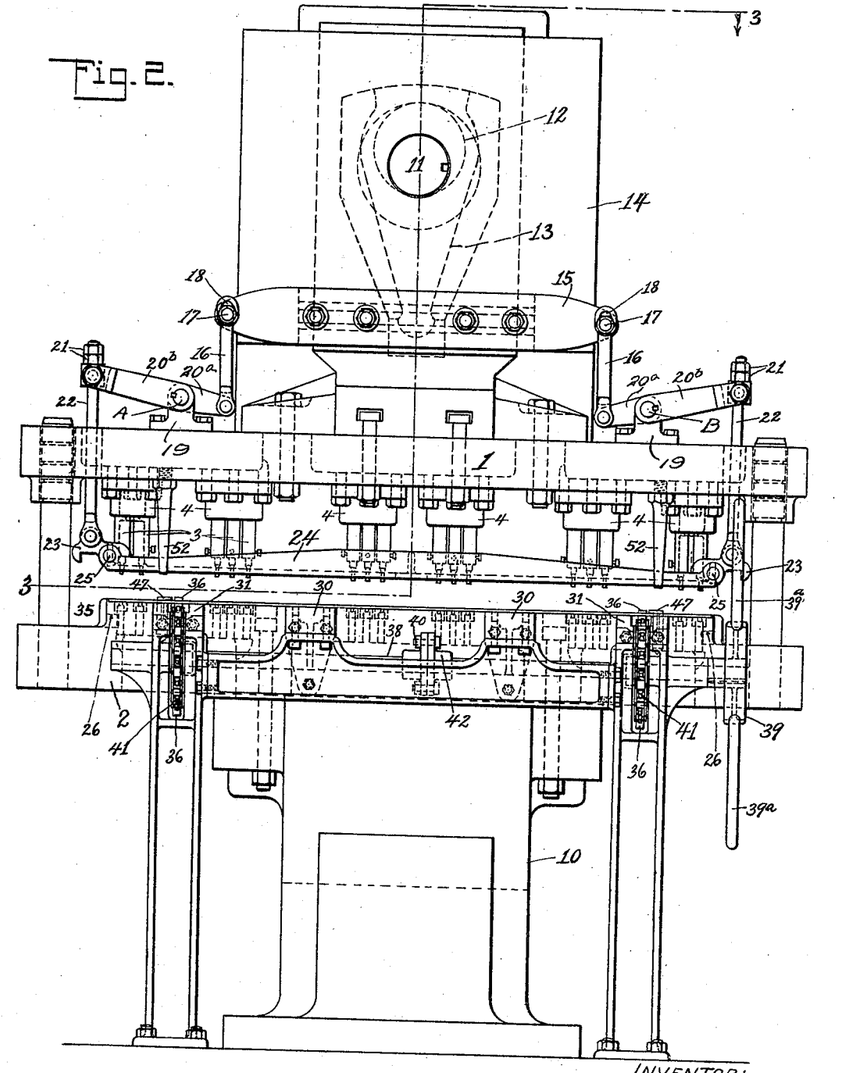
Fig. 2 is a front elevational view thereof.

Rigidly connected to each shaft are rockable members serving as levers and composed of the arms 20$^a$, 20$^b$ and 20$^c$. The outer end of each of the arms 20$^a$ is pivotally connected with the lower end of a slotted link 16, as shown in Fig. 2. The arms 20$^b$ and 20$^c$ are preferably spaced apart and secured to the ends of each of the shafts A and B projecting beyond the bearings 19.

Figure 5:
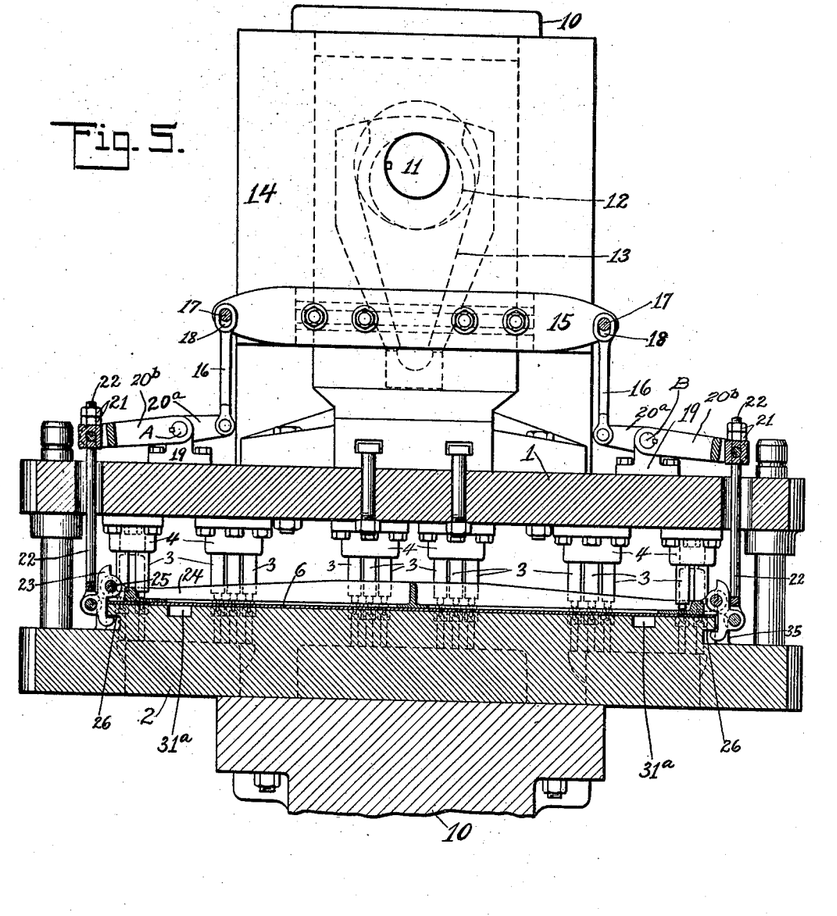
Fig. 5 is a vertical sectional view, being taken on line 5—5 of Fig. 3.
Figure 6:
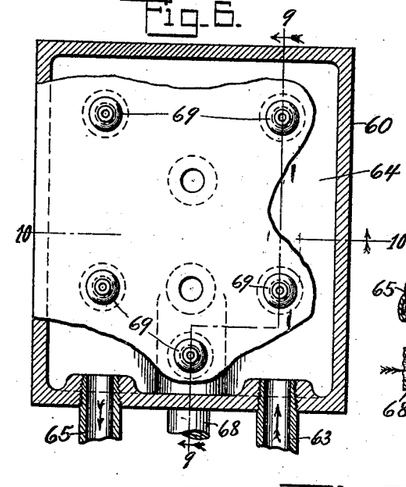
Fig. 6 is a fragmentary plan view of one of the gas burners hereinafter described.
Figure 7:
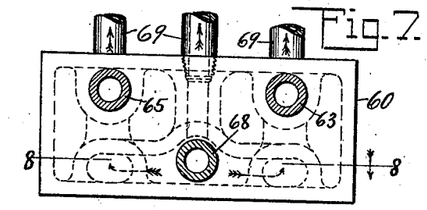
Fig. 7 is an end elevational view thereof.
Figure 8:
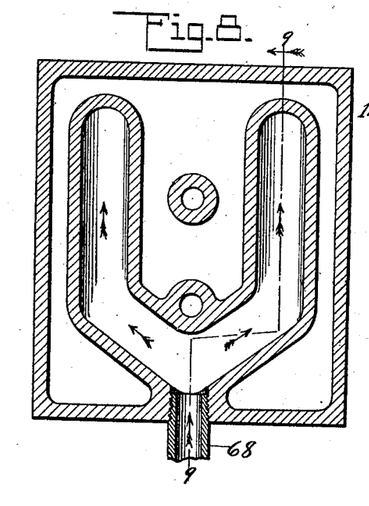
Fig. 8 is a sectional view, being taken on line 8—8 of Fig. 7.
Figure 9:
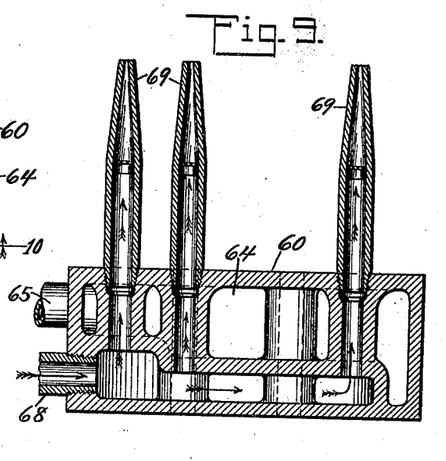
Fig. 9 is a vertical sectional view through the burner taken on line 9—9 of Figs. 6 and 8.
Figure 10:
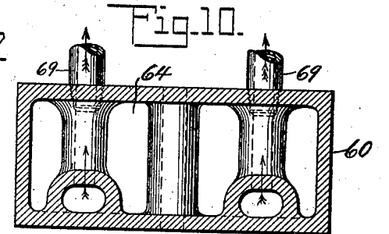
Fig. 10 is a vertical sectional view, being taken on line 10—10 of Fig. 6.
Figure 11:
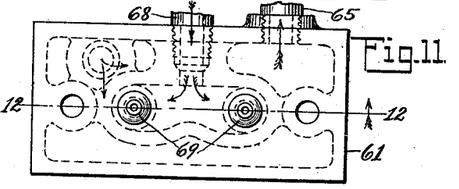
Fig. 11 is a plan view of a modified form of burner.
Figure 12:
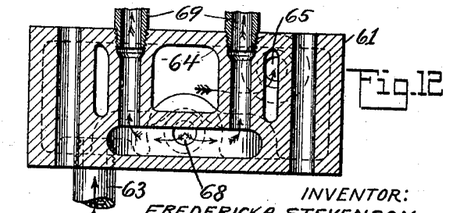
Fig. 12 is a vertical sectional view thereof, the section being taken on line 12—12 of Fig. 11.
Figure 15:
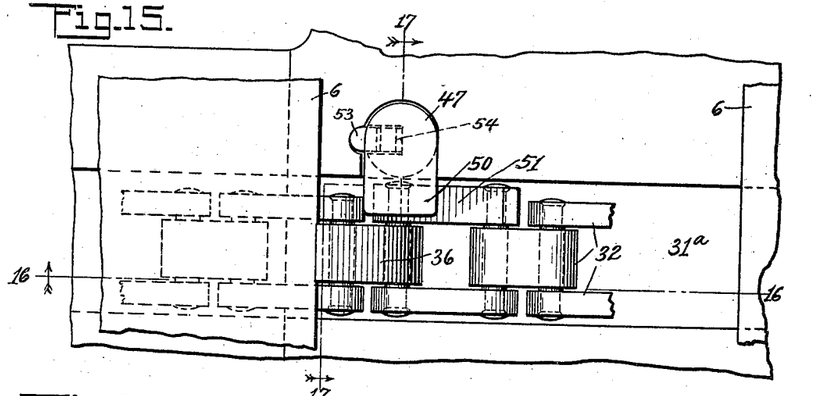

The outer ends of each of the arms 20$^b$ and 20$^c$ may be bifurcated or forked, as shown, to provide a slidable and pivotal connection with the stripper rods 22. To form a part of this connection, a block, serving as a stop, is rotatably mounted in the bifurcated or forked end, and is provided transversely with a passage through which the upper end of a stripper rod 22 passes. In order that the rod may have its length adjusted, the upper end is threaded and the nuts 21 are adapted to coöperate therewith, from which it will be seen that the rods 22 may slide through their respective blocks and also have a pivotal connection with the arms 20$^b$ or 20$^c$ as shown more particularly in Fig. 5.

The lower ends of the stripper rods 22 are pivotally connected with stripper hooks 23, that in turn are pivotally mounted on the stripper 24 through suitable means as the bolts 25 serving as bearing pins. The hooks 23 are adapted to extend downwardly, so that when in a locked position they will engage with suitable ledges or flanges 26, that are carried by the stationary bed 2 and upon which are secured the dies above referred to. In this connection it is to be noted that said stationary bed is suitably cored out to provide passages coincident with the punches to permit egress of any metal which may be punched from the sheets 6, though this is common practice with punching machines and is not illustrated in detail except by dotted lines in the drawings. When the movable head is lowered to the position shown in Fig. 5, the stripper hooks 23 engage the stationary bed to hold the strippers 24 in position, thus permitting withdrawal of the punches while the stripper 24 holds the punched sheet 6 in position upon said stationary bed, after which upward movement of the movable head 1 will cause the outer ends of the levers 20 to rise and contact with the nuts 21 on the upper ends of said rods 22, and as the rods 22 move upwardly, the stripper hook 23 is rocked on its pintle to the position shown in Fig. 2, in which view said hook is shown as released from engagement with the stationary bed 2 and the stripper 24 is shown in elevated position, thus releasing the work or punched sheet so that it may be moved toward the discharge end of the machine.

Figure 4:
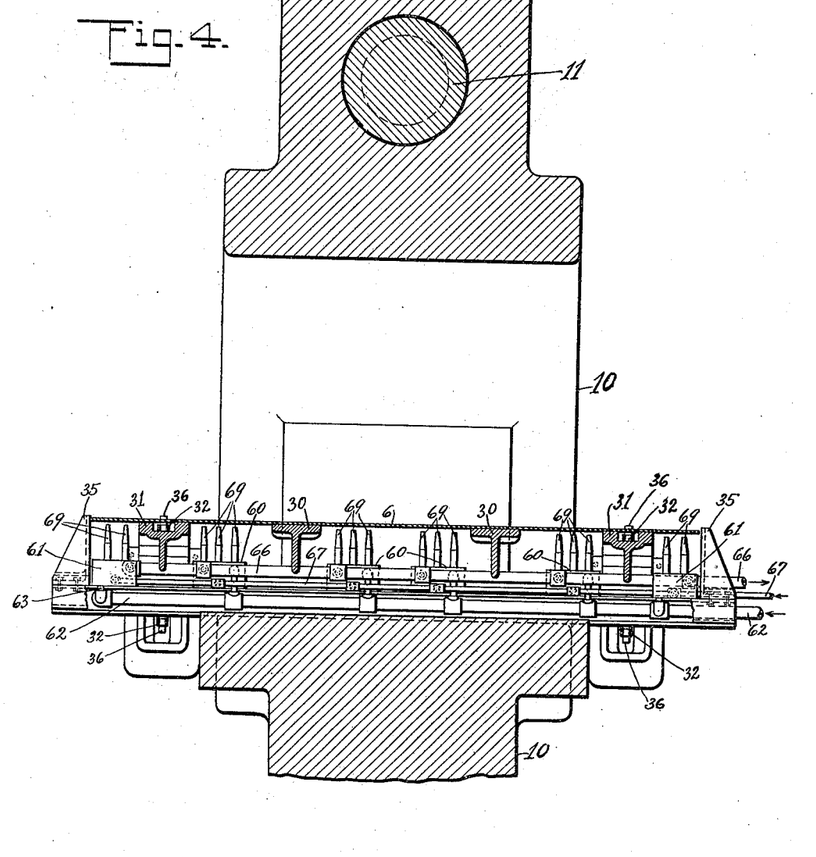
Fig. 4 is a vertical sectional view, being taken on line 4—4 of Fig. 1.

The bed of the machine comprises said stationary bed 2 with forwardly and rearwardly extending arms 30 and 31, all of said arms 30 and 31 being connected respectively with said stationary bed and with the end braces or end ties connecting said arms. The outer arms 31 at each end of the machine are slotted as shown in Fig. 4 and adapted to travel in slots in the upper face of said arms 31 are the sprocket chains 32 which, as noted in Fig. 1 and said Fig. 4, extend on the upper side of and ride in the slots of said arms 31 and are supported thereby, extending thence below the stationary bed 2, as shown in Fig. 1.

Figure 16:
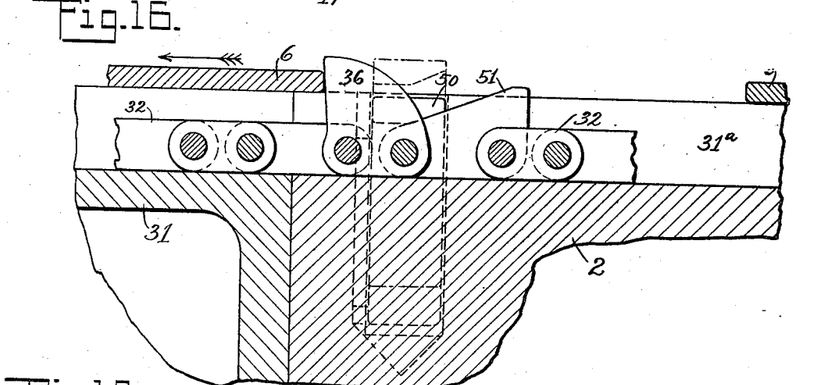
Fig. 16 is a vertical sectional view taken on line 16—16 of Fig. 15.
Figure 17:
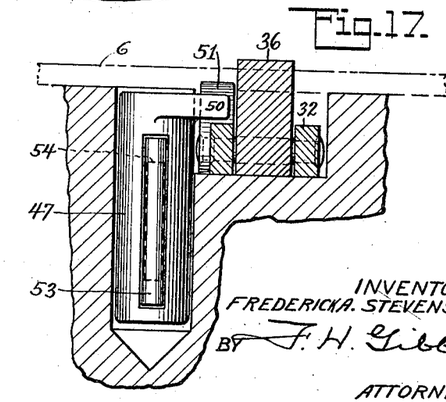
Fig. 17 is a sectional view, the section being taken on line 17—17 of Fig. 15.
Figure 18:
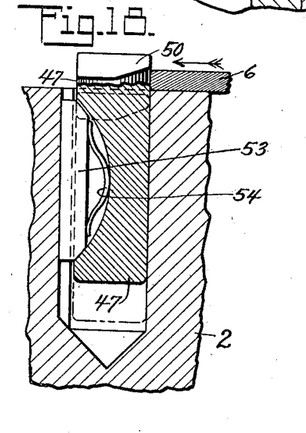
Fig. 18 is another sectional view taken approximately on line 18—18 of Fig. 3, illustrating details of the stop and conveyer mechanism of Figs. 15 and 16.

Connected with the stationary bed are guides 35 for the sheet 6, which guides limit the travel of said sheets transversely of the bed of the machine. Connected with the sprocket chains 32 are lugs 36 which, as shown in Figs. 1, 4 and 16, extend above the plane of said bed so as to be in position to engage the sheets 6 when they rest on said bed and thereby cause said sheets to travel from the feed end of the machine to the discharge end thereof.

Movement of the chains should be synchronized and they may be driven by any suitable means. For the purpose of illustrating a simple means, the shaft 38 is provided at one end with a hand-wheel 39 and spokes 39ª, which latter may be grasped by the operator to cause rotation of said shaft 38 and the sprocket wheels 41, one at each end of said shaft, with which said sprocket wheel the sprocket chains 32 engage in an ordinary manner.

To secure proper alinement of the lugs 36 transversely of the machine, the shaft 38 is divided as shown in Figs. 3, 13 and 14, and a suitable compensating clutch is provided which will permit either half of the said shaft 38 to rotate slightly without rotation of the other half when the bolts 40 are loosened so as to permit said bolts to travel in the slots 39ᵇ in one of the heads 42 of the shaft coupling means, while suitable keys 43 on said shaft sections 38 prevent rotation of each section of the shaft in its proper head member. If desired, set screws 44 may be employed either with or without the keys 43 to cause proper engagement of the parts just referred to, whereby when the shaft-connecting means are properly adjusted and the shaft sections positioned, the lugs 36 at each side of the machine may be placed in transverse alinement so as to insure symmetrical progress of the sheets 6 through the machine within the side guides 35, before referred to, thereby insuring accurate register of openings punched in any number of said sheets in so far as transverse disposition is concerned.

To insure proper register of said openings longitudinally of the plates, as longitudinally is considered with reference to the line of travel of a sheet through the machine, stops 47 are provided at each side of the stationary bed plate as shown in Figs. 1, 3, 15, 16, 17 and 18, against which stops the sheets 6 are carried by the lugs 36, before referred to, while the sheets are being punched.

Means are provided for raising and lowering said stops as follows:

The stops 47 are provided with offset extensions 50 which extend over and in the path of cams 51 carried by the sprocket chains before referred to, which cams are properly disposed so that at the proper time they will ride under the offset portions 50 of the stops and elevate said stops to bring them into the path of travel of a sheet to be punched. Said stops include a friction-producing grip 53 and actuating spring 54 designed to prevent accidental depression of the stops and at the same time permit them to be driven downwardly into the machine bed by depending studs 52 shown in Figs. 1 and 2 when desired. Said friction-producing means will not prevent vertical movement of the stops under the impulse of cams 51, before referred to, when it is desired to lift the stops.

From the foregoing it will be noted that means are provided for causing progressive movement of a sheet of metal from the feed end to its discharge end always within control of the operator and it is preferred that the parts shall be so proportioned that relatively rapid motion may be imparted to said sheets, so that when predetermined zones of said sheets have been heated, as hereinafter described, the sheets may be immediately punched without removing them from the bed of the machine on which the heating occurs.

In the article of manufacture in which the sheets are to be used, when operated upon as hereinafter described, it is necessary that a relatively large number of holes shall be punched, some of which are very close together, that is, within a restricted zone compared with the entire area of the sheet, hence great accuracy is required as is also speed of operation.

To prepare the sheets for punching, they are first placed upon the feed end of the machine in the position represented at the right upper end of Fig. 3, the sheet being here indicated by reference letter A and being shown in dotted lines. Similar representations of said sheet A appear in said figure near the middle of the figure and at the lower left or discharge end of the machine represented in said figure and, for convenience, said sheets are lettered respectively $A^1$, $A^2$, and $A^3$. As will be seen from said figure, the sheets are of relatively symmetrical contour and are provided with slots B (see sheet $A^3$) contiguous to which there are, represented in sheet $A^3$, a number of perforations placed relatively near the edge of said sheet and surrounding said slots B. It will be apparent to one skilled in the art that such disposition of the punched openings would cause fracture of the sheets if the sheets were punched while cold and it is to fit said sheets for such punching that the heating features hereinafter described are provided.

Referring to said Fig. 3, it will be noted that there are four master burners 60 so disposed transversely of the machine as to rest below the slots B, before referred to, while other master burners 61 are disposed one at each side of the machine and just within the side guides 35.

These burners are of the type adapted to burn oxygen and acetylene or hydrogen and acetylene gas and are shown in detail in Figs. 6 to 12 inclusive and are preferably water jacketed to prevent excessive heating of the burners in operation.

Suitable water conduits or headers 62 are provided from which extend branch pipes 63, communicating with the interior of the burner shells 64, to conduct cooling fluid into the interior of said burner shells while branch conduits 65 conduct said fluid from said burners to the return header 66, and gas conducting conduits 67 are provided with branch conduits 68 leading through the interiors of said burners to the burner tips 69.

When gas issuing from the tip 69 is ignited and a sheet $A^1$ is placed in position to be heated by said gas in isolated spots arranged in clusters within a limited zone thereof, heat will be rapidly communicated to said sheet, whereupon the conveying mechanism is employed to move it into position below the punches, whereupon the movable head carrying the punches is lowered, thereby forcing the punches through the sheet 6 within the heated portion thereof, after which the punches are retracted, the stripper automatically strips the sheet from said punches and the sheet can be moved from the position $A^2$ to the position $A^3$ from which it may be conveyed manually or otherwise.

One particular feature to be noted in connection with the heating of the sheets, is that the color of the heat may be clearly seen, as the heated areas are more or less well defined on the upper side of the sheet. The absence of any artificial illumination, such as by the electric arc, on the upper side of the sheet and opposite the points of application of heat, enables the operator to more quickly and accurately determine the proper heat color. It is usual to visually note the different heat colors that may be seen. As the points of application of heat are on the under side of the sheet, the distracting light rays will be shielded from the operator, and therefore the heat colored areas or zones produced on the upper side will stand out prominently, particularly with reference to the remainder of the sheet.

What I claim is:

1. In combination in a punching machine, a supporting bed, gas-heating burners supported below the upper plane of said bed, dies held by the bed, means for conveying a sheet of metal from above said burners to position above said dies, and reciprocating punches co-acting with said dies.

2. In combination in a punching machine, a supporting bed, spaced and connecting heating means supported thereby, and means for supporting an article to be spot heated in a plurality of zones by said heating means, said supporting means also carrying dies and reciprocatory punches to co-act with said dies to remove the major portions of each of said spots to produce a hole therein.

3. In combination in a punching machine, a supporting bed, spaced and connecting heating means supported thereby, means for supporting an article to be heated in spots by said heating means, said supporting means carrying dies, and conveying means co-acting with said article adapted to move it from the heating means to position above said dies.

4. In combination in a punching machine including punches and dies, a supporting bed, spaced groups of connected heating means carried thereby, article holding means for retaining an article in position to be heated from the under side by the heating means and independently of the punching position, and means for moving said article after heating to the punching position.

5. In combination in a punching machine including punches and dies, a supporting bed, a plurality of spaced and connected gas burners arranged to heat spaced and predetermined zones in a metallic article, means for supporting the article to be heated, and conveying means adapted to move the article, while the zones are still hot, into position for a punching operation to produce perforations in said heated zones.

6. In combination in a punching machine, a supporting bed, a plurality of spaced and connected gas burners carried thereby and each burner being capable of heating spots in a circumscribed zone in an article, means for supporting an article in position for such spot heating, stationary dies carried by the supporting bed, punches for the dies, stripping means to coöperate with the article and the punches and dies, and conveying means serving to move the article from the burners to a position to be acted upon by the punches and dies while the spots in the zones are still hot.

7. In combination in a punching machine, a supporting bed having work-holding extensions, a conveying means operative on the bed and extensions, a plurality of groups of spaced jet gas burners carried by one of the extensions and capable of the simultaneous regional heating of an article, as a piece of work, said latter extension serving as a work-supporting bed for retaining the article while predetermined regions are being heated, and spaced punches and dies for a subsequent perforating operation in the heated regions of the sheet, the spacing of the heated regions corresponding to the punch and die spacing.

8. In combination in a punching machine, a supporting bed, a conveying mechanism operative over the bed for intermittently moving an article to be operated upon, gas burners provided with spaced outlets capable of having a predetermined arrangement and adapted to heat particular areas of an article, said burners being disposed near one side of said bed, and punches and dies carried by the machine that are adapted to have a predetermined arrangement similar to the burner outlet disposition and corresponding to the hottest part of each of the heated areas, said conveying mechanism serving to shift the article after such area heating to a position relative to the punches and dies for a perforating operation upon the article, and thereafter to shift the article on the bed.

9. The combination with a punching machine including punches, dies, and a stripping device, of a supporting bed provided with article and work-supporting extensions, a plurality of spaced gas burners arranged transversely of one of the extensions in a predetermined order so that the flame issuing from the burners will be directed upwardly against the underside of an article to produce defined heated areas therein, and a conveying mechanism for immediately shifting the article from the burners, after the proper heating of such areas, to a position to be operated upon for producing perforations in the heated areas, and thereafter to shift the article to the opposite extension when the punching operation is completed.

10. In combination in a punching machine, a grooved supporting bed including dies carried thereby, grooved supplemental beds extending from the sides of the bed and forming work-supporting extensions, spaced groups of spaced gas burners arranged transversely of and near one side of one of the extensions, conveying means operative in the grooves for the intermittent shifting and transferring of an article across the several beds, punches adapted to reciprocate and coöperate with the dies, said punches and dies having the same spacing and grouping as the burners, and said burners being so positioned that the flames issuing therefrom will heat and soften predetermined circumscribed areas of an article that the punches are adapted to punch out.

11. In combination in a punching machine, a supporting bed therefor, spaced groups of gas burners arranged in predetermined areas to direct their flames against the underside of an article so that the heating effect is visible in defined areas on the upper side of said article, and conveying means for immediately shifting the article to a punching position.

12. In combination in a punching machine, upwardly directed gas burners for temporarily producing soft spots of defined areas in an article, punches and dies for punching out said spots while soft, and means for shifting said article after heating and after punching.

13. In combination in a punching machine including punches and dies arranged in a predetermined manner to correspond to a prearranged lay-out on an article to be perforated, spaced groups of burners having spaced jets for simultaneously heating particular areas indicated by the lay-out, and conveying means for shifting the article to a position to be operated upon by the punches and dies for striking out such heated areas.

14. In combination in a punching machine including punches and dies and having a supporting bed, means directed to apply heat to the underside of a metallic sheet for heating spaced areas in defined zones therein before and independently of any punching operation, and means for shifting the sheet to the bed and into position for a punching operation.

15. In combination in a punching machine including punches and dies, a supporting bed, means carried thereby for heating through, from the underside, spaced areas in defined zones in successive metallic sheets prior to and independently of any punching operation, and means operative on the bed to shift each sheet from the heating position to the punching position where perforations are made in each heated zone.

16. In combination in a punching machine including punches and dies and having a supporting bed, upwardly directed gas burners for heating spaced spots in different zones in a metallic sheet without punching, and means for shifting the sheet after heating to the punching position for punching holes in the heated zones.

17. In combination in a punching machine including punches and dies and having a supporting bed provided with spaced work-supporting sections connected thereto, spaced groups of gas burners arranged on one of the sections for heating and softening particular areas in a metallic sheet, the punches and dies being arranged with reference to the spacing of the burners so that they will operate on the sheet only in the heated areas, and means for shifting the sheet from the heating position on one of the sections to the bed for a punching operation, and afterward therefrom to the other section.

18. In combination in a punching machine including punches and dies and having a supporting bed, spaced groups of gas burners carried thereby and operative to direct their flames to particular parts on the under side of a sheet of metal to produce heat colored areas visible on the upper side, and conveying means to shift the sheet to a punching position, after the proper heat color is obtained, for removing disks of heated metal from the heated areas of the sheet.

19. In combination in a machine for punching sheet material including punches and dies, a burner comprising a plurality of spaced jets arranged to heat a plurality of areas in zones in said sheet as predetermined by the punch and die disposition, and means for shifting the sheet after such heating to the punches and dies for perforating said heated areas.

20. In combination in a machine for punching sheet material including punches and dies, a gas burner comprising a plurality of spaced jets adapted to heat particular areas in a zone in a sheet as predetermined by the punch and die arrangement, said jets being so placed that their flames are directed against the under side of the sheet, which sheet, during heating, serves to shield the eyes of an operator from the flames so that the discolorations produced on the upper surface of the sheet are more readily discerned, and conveying means for shifting the sheet from above said burner to a position above said dies to permit the punches to perforate said areas while hot.

21. In combination in a punching machine including punches and dies, a plurality of spaced vertically directed burners arranged to heat particular areas in a predetermined zone in a sheet of material, and means for shifting said material into position for a punching operation in said heated areas.

22. In combination in a machine for punching sheet material including punches and dies, a group of spaced vertically directed burners arranged to heat a plurality of predetermined spots in a zone in a sheet of material, and means for shifting said material after such heating to a position where the punches and dies will produce perforations in the hot spots of said sheet material.

23. In combination in a punching machine including punches and dies, a group of burners having their jets arranged in spaced relation and adapted to direct separated heating flames against the under side of a metallic sheet to heat substantially isolated areas in a predetermined zone, and means for shifting said sheet from above said burners to a position between the punches and dies for producing perforations in said isolated areas while they are still hot.

24. In combination in a machine for punching sheet material including punches and dies, a gas burner comprising a plurality of spaced jets having upwardly projecting outlets adapted to heat predetermined areas in a zone in a sheet, and means for shifting the sheet, while such areas are still hot, so that the punches and dies can perforate said areas.

25. In combination in a machine for punching sheet material including punches and dies, a plurality of burners each having spaced jets to simultaneously heat through, from the under side of a sheet, spaced areas arranged in groups, and means for shifting the sheet to a punching position for removing the hottest portion of each of said areas.

26. In combination in a machine for punching sheet material including punches and dies, a burner having a plurality of jets arranged to have their flames impinge against the underside of a sheet for heating entirely through spaced areas thereof, and means for shifting the sheet from above the burners to a punching position.

27. In combination in a machine for punching sheet material including punches and dies, a burner having a plurality of separate jets arranged to heat through, from the underside, predetermined sections in a zone of a sheet of material, and means for shifting the sheet after heating to a punching position.

28. In combination in a machine for punching sheet material including punches and dies, a gas burner having vertically arranged spaced jets disposed to heat through predetermined and spaced portions of a sheet of material, and intermittently operated conveying means for shifting the sheet from the heating position to a punching position.

29. In combination in a machine for punching sheet material including punches and dies, a plurality of gas burners, each burner comprising a plurality of spaced jets adapted to direct their flames against the under side of a sheet of material for heating through spaced sections in a zone thereof, and means for shifting the sheet from the heating position to a position for punching out the hottest portions of said heated sections.

30. In combination in a machine for punching sheet material including punches and dies, spaced gas outlets serving as jets, directing their flames against the underside of a sheet to independently and simultaneously heat spaced areas in a zone thereof, and means for shifting the sheet after such area heating to a punching position.

31. In combination in a machine for punching sheet material including punches and dies, a plurality of burners, each having upwardly directed spaced jets to independently and simultaneously heat spaced areas in different and defined zones in a sheet of material, and means for shifting the sheet to a punching position when the proper heat is obtained.

32. In combination in a machine for punching sheet material including punches and dies, capable of a perforating operation on a sheet, a plurality of burners each having spaced vertical jets to independently and simultaneously heat spaced areas arranged in groups in separate zones in a sheet of material, and conveying means operative to remove the sheet, when such areas are properly heated, to a perforating position.

33. In combination in a punching machine including punches and dies, a stripping device comprising an arm secured to a frame member of the machine, spaced rockable shafts, a link loosely connected to each end of the arm and having its other end secured to a shaft, levers secured to each of the shafts, and stripper rods connected to the levers and to stripper hooks.

34. In combination in a punching machine including punches and dies, a stripper operating mechanism comprising a transversely extending arm secured to a frame member of the machine, links each having a pin and slot connection with each end of the arm, shafts and bearings therefor connected with the other ends of each of the links, rockable means secured to and extending from each of the shafts, and stripper rods adjustably connected with the outer end of each of said rockable means and having their other ends connected with stripper hooks, said hooks being connected together by a strtipper for simultaneous movement.

35. In combination, a stripping mechanism comprising a transverse arm provided with bearing pins at each end, links, each having one end slotted to engage with each of the pins to provide a loose connection therebetween, rockable shafts including bearings and each having the other ends of the links secured thereto, rockable means, each having one end secured adjacent the ends of each of the shafts, the other ends of said means being adapted to form a pivotal connection with stripper rods, a stripper rod adjustably secured in each pivotal connection, a plurality of spaced pivotally mounted stripper hooks, each having a pivotal connection with the other end of a stripper rod, and a stripper carrying the stripper hooks.

36. In combination in a punching machine including punches and dies, a stripping device comprising a transverse arm secured to a frame member of the machine, spaced rockable shafts, links, each provided at one end with a slot for a loose connection with each end of the arm and having the other end secured to a shaft, rockable means secured to each of the shafts, stripper rods adjustably connected to the rockable means, and a stripper extending between and connected to the rods through pivotally mounted stripper hooks.

37. An apparatus for producing holes in sheet metal, which comprises a burner having a plurality of spaced jets arranged to simultaneously heat separated spots in a sheet of metal, means operative after such heating to produce holes in the heated spots, and means for shifting the sheet from the burner to the hole producing means.

38. An apparatus for producing holes in a sheet of metal, which comprises a burner having a plurality of spaced jets adapted to have their flames impinge on the underside of a sheet, punches and dies for removing spaced areas of heated metal, and means for shifting the sheet to and from the punches and dies.

39. An apparatus for producing holes in a sheet of metal comprising a supporting bed and dies carried thereby, a movable member carrying punches to coöperate with the dies, and heating means carried by said supporting bed and arranged to heat separate spots in groups in said sheet before the punches and dies operate thereon to make holes therein.

40. In combination in a punching machine, a supporting bed, stationary dies on said bed, movable punches to coöperate with the dies, and heating means supported in a plane below the surface of said bed and adapted to temporarily produce disconnected and spaced soft spots in a sheet of metal for a punching operation thereon.

41. In combination in a punching machine, a supporting bed provided with spaced dies, spaced movable punches adapted to cooperate with the dies for removing predetermined heated areas in spaced zones from a sheet of metal, and burners having a plurality of jets arranged to heat said areas from the underside of said sheet of metal supported on said bed.

42. In combination in a punching machine, including punches and dies, a gas burner having a plurality of upwardly directed jets arranged to heat predetermined and spaced spots in a sheet of metal to be removed by the action of the punches and dies, and a supporting means adapted to carry said dies and gas burner.

43. An apparatus for producing holes in a sheet of metal comprising a bed having spaced dies thereon, movable punches for said dies, and heating means supported below the plane of said bed for producing soft spots in said sheet of metal corresponding to the punch and die spacing, said spots being removed by a subsequent operation of the punches and dies on said sheet.

44. An apparatus for producing holes in a sheet of metal comprising a punching machine having a bed and including movable punches and stationary dies, and a burner having a plurality of jets arranged to heat localized areas to be removed by said punches and dies from said sheet of metal.

45. In combination in a punching machine including a bed and punches and dies, heating means comprising burners each having spaced individual outlets arranged in groups for heating spaced areas adapted to be removed from a sheet of metal by said punches and dies.

46. A machine for punching armor plate comprising a bed having stationary dies thereon, a movable head carrying punches for the dies, and a gas burner having a plurality of spaced individual outlets adapted to heat predetermined areas in a plate for a subsequent punching operation to remove said heated areas.

47. A machine for punching armor plate comprising a work-supporting and die-carrying bed, movable punches to coöperate with the dies, and gas burners each having a plurality of jets arranged to heat predetermined areas in zones in a plate for a subsequent removal by said punches and dies.

48. A machine for punching armor plate comprising a bed having stationary dies thereon, a movable head carrying punches for the dies, and gas heating means composed of burners each having a group of spaced individual outlets arranged to heat predetermined spots in spaced groups in an armor plate to be thereafter punched from the plate by said punches and dies.

49. A machine for punching armor plate comprising a work and die-supporting bed, a frame and a die-carrying head movable relative thereto, and heating means arranged to heat isolated areas in zones in armor plate to be perforated by said punches coacting with the dies.

50. An apparatus for producing holes in armor-plate comprising heating means for heating predetermined areas in zones in a plate, means for maintaining the heating means spaced from said plate during heating, and pressure operated means for mechanically perforating said areas.

51. An apparatus for perforating armor plate comprising spaced burners each having a plurality of spaced outlets arranged to heat predetermined and spaced areas in a plate, a frame and a bed, stationary dies on said bed, a head movable in said frame and provided with punches to coöperate with said dies for perforating said heated areas, and means for moving said head.

52. An apparatus for perforating armor plate comprising a punching machine including movable punches and a die-carrying bed, said punches and dies being arranged in accordance with the layout for the perforations, and gas burners each having spaced upwardly directed jets arranged to direct their flames against the underside of a plate for heating areas in a plate corresponding to the perforation layout, said punches and dies being operative to perforate said heated areas.

53. An apparatus for perforating armor plate comprising a punching machine including punches and a work-supporting bed provided with dies, and burners, each of which is provided with a plurality of upwardly directed jets spaced to conform to the punch and die arrangement for simultaneously heating through predetermined and spaced sections of said plate, to be perforated by the coöperative action of the punches and dies.

54. In combination in a punching machine including punches, dies and a bed, an apparatus for producing well defined soft areas in spaced groups comprising flame-emitting means for applying heat to the underside of a sheet of metal by units spaced in groups to simultaneously and individually soften said areas to be punched out by the action of said punches and dies.

55. A machine for punching armor plate comprising punches and dies and a bed, and means for applying heat to a plate by flame-emitting units to simultaneously and separately soften areas spaced in groups therein to be subsequently removed by said punches and dies.

56. An apparatus for producing holes in armor-plate comprising flame emitting means for heating isolated areas in zones in a plate, supports for maintaining said heating means spaced from contact with the plate, and punches and dies for perforating said heated areas.

57. A machine for punching armor-plate comprising a bed, dies carried thereby, movable punches to coöperate with the dies, heating means supported by said bed and arranged to heat spaced areas in zones in a plate to be perforated by said punches and dies, and means secured on the machine adjacent one side of the bed for supporting and spacing said heating means from contact with said plate during heating.

58. A machine for punching armor-plate comprising a frame, a die-carrying bed thereon, a punch-carrying head movable in said frame, flame emitting heating elements provided with spaced jets for heating predetermined spots in zones in a plate to be perforated, and means on the frame for supporting said elements a predetermined distance from the plate during heating.

59. A machine for punching armor-plate comprising a frame, a die-carrying bed thereon, a punch-carrying head movable in said frame to coöperate with the dies, heating means supported adjacent the die-bed for heating through, from the underside of a plate, a plurality of isolated sections spaced in groups to be subsequently perforated, and means for supporting the heating means below and spaced from contact with the plate.

60. A machine for punching armor-plate, comprising a frame, a die-carrying bed thereon, a punch-carrying head movable in said frame to coöperate with said dies, heating means supported adjacent the bed for heating a plurality of isolated sections spaced in groups to be subsequently perforated, means for supporting the heating means, and means to support said plate during heating and operable to shift said plate from above said heating means to a punching position.

In witness whereof I have hereunto set my hand in the presence of two witnesses.

FREDERICK A. STEVENSON.

Witnesses:
E. W. STUDER,
A. REHDORF.

Copies of this patent may be obtained for five cents each, by addressing the "Commissioner of Patents. Washington, D. C."